United States Patent

[11] 3,617,576

[72] Inventor Al F. Kerst
Littleton, Colo.
[21] Appl. No. 27,984
[22] Filed Apr. 13, 1970
[45] Patented Nov. 2, 1971
[73] Assignee Monsanto Company
St. Louis, Mo.

[54] METHODS OF SCALE INHIBITION
23 Claims, No Drawings
[52] U.S. Cl.................................................. 210/58,
21/2.7, 252/180, 260/429.9, 260/448, 260/465.1,
260/485, 260/502.4
[51] Int. Cl.................................................. C02b 5/06
[50] Field of Search............................................ 260/465.1,
501.21, 502.4, 485, 456, 429, 429.9, 448; 210/58;
252/180; 21/2.7

[56] References Cited
UNITED STATES PATENTS

| | | | |
|---|---|---|---|
| 3,299,123 | 1/1967 | Fitch et al..................... | 260/501.21 X |
| 3,422,137 | 1/1969 | Quimby........................ | 260/501.21 X |
| 3,451,939 | 6/1969 | Ralston ........................ | 252/181 |
| 3,487,018 | 12/1969 | Troscinski................... | 210/58 |
| 3,496,223 | 2/1970 | Irani et al..................... | 260/502.4 |
| 3,528,998 | 9/1970 | Tesoro ......................... | 260/348 |

*Primary Examiner*—Michael Rogers
*Attorneys*—Herbert B. Roberts, Roger R. Jones, James J. Mullen and Neal E. Willis ABSTRACT: The precipitation of scale-forming salts in an aqueous system is inhibited by adding either stoichiometric or substoichiometric amounts to said system of an organophosphorus compound which is a substituted ethane diphosphonic acid or its salt, said organophosphorus compound having the formula:

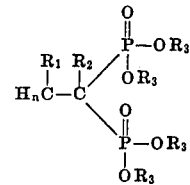

wherein $R_1$ and $R_2$ are hereinafter defined and $R_3$ is hydrogen or a metal ion and $n$ is an integer having a value of 1 or 2.

METHODS OF SCALE INHIBITION

METHODS OF SCALE INHIBITION

This invention relates to methods for inhibiting the precipitation of metal ions from aqueous solutions, and more particularly, to the use of substituted ethane diphosphonic acids and their salts or mixtures to accomplish this purpose.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their reaction solubility product concentrations are no longer exceeded. For example, when the concentrations of calcium ion and sulfate ion exceed the solubility of the calcium sulfate, a solid phase of calcium sulfate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems, oilwells, and the like, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts under certain conditions are not always desirable or economical.

More than 25 years ago it was discovered that certain inorganic polyphosphates would prevent such precipitation when added in amounts less than the concentrations needed for sequestering or chelating. See, for example, Hatch and Rice, "Industrial Engineering Chemistry," vol. 31, pages 51 and 53; Reitmeier and Buehrer, "Journal of Physical Chemistry," vol. 44, No. 5, pages 535 and 536 (May 1940); Fink and Richardson U.S. Pat. No. 2,358,222; and Hatch U.S. Pat. No. 2,539,305, all of which are incorporated herein by reference. For sequestration, the mole ratio of precipitation inhibitor equivalents to scale forming cation is usually 1:1 or greater (2:1, 3:1, etc.). These ratios are referred to as stoichiometric. Substoichiometric amounts would include all mole ratios of precipitation inhibitor equivalent to scale forming cation that are less than the level required for sequestration; this phenomenon is known in the water treating art as the "threshold" effect.

It is to be understood that the term "threshold" as utilized herein refers to the chemical and/or physical phenomenon that less than stoichiometric quantities of the particular precipitation inhibitor can effectively prevent the precipitation of various metallic ions such as calcium, iron, copper and cobalt. In other words, the "threshold" treatment of water is that technique by means of which less than stoichiometric quantities of the treating agent are added to interfere with the growth of crystal nuclei and thereby prevent the deposition of insoluble deposits.

Consequentially precipitation inhibitors which function as a threshold agent and a sequestering agent represent an advancement in the art and are in substantial demand.

Therefore, an object of this invention is to provide a method for inhibiting the precipitation of metal ions from aqueous solutions.

Another object of this invention is to provide a precipitation inhibitor which is effective in inhibiting the precipitation of metal ions in acid or alkaline aqueous solutions.

A still further object of this invention is to provide a precipitation inhibitor which is effective in inhibiting the precipitation of calcium ions in acid or alkaline solutions.

Other objects will become apparent from a reading of the following description. It has been found that certain organophosphorus compounds, i.e., substituted ethane diphosphonic acids and their salts, unexpectedly function as superior precipitation inhibitors when used in substoichiometric concentrations. This phenomenon includes what is generally known in the art as the "threshold effect." Furthermore these organophosphorus compounds function as sequestering agents where one so desires to use the same.

These substituted ethane diphosphonic acids and their salts have the following generic formula:

(I) 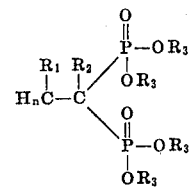

In the above formula I, $R_1$ can be from the group oxygen; halogen; hydroxy; $-CN$; $-N(R_4)_a$, where $R_4$, is from the group hydrogen and alkyl containing from to 30 carbon atoms, preferably from one to eight carbon atoms and more preferably from one to four carbon atoms; $-XR_5$, where X is from the group oxygen and sulfur and $R_5$ is from the group alkyl containing from one to 30 carbon atoms, preferably one to eight carbon atoms, more preferably one to four carbon atoms; $C_6H_5$ (phenyl) and $CH_2 \cdot C_6H_5$ (benzyl); acetoxy; $-SO_3R_4$ where $R_4$ is the same as defined above; benzoyl; $-CO_2H$; and $-CH(COOR_6)_2$, where $R_6$ is an alkyl group containing from one to 30 carbon atoms, preferably from one to eight carbon atoms, and more preferably from one to four carbon atoms.

In the aforegoing general formula I, $R_2$ is from the group $R_1$, except oxygen, and hydrogen. It is to be understood that $R_2$ then is never oxygen and $R_2$ is only hydrogen when $R_1$ is oxygen. Additionally, it is to be understood that in all cases, except when $R_1$ is oxygen and $R_2$ is hydrogen, at least $R_1$ or $R_2$ is a hydroxy group. In other words and for exemplary purposes only, when $R_1$ is chlorine, $R_2$ must be a hydroxy group.

In conjunction with the proviso that $R_2$ is only hydrogen when $R_1$ is oxygen with reference to the aforegoing general Formula I, $n$ is an integer having a value of 1 or 2 and $n$ is only 1 when $R_1$ is oxygen.

In Formula I, $R_3$ is from the group metal ions and hydrogen. The aforementioned metal ions are from the group of metals which includes without limitation alkali metals such as sodium, lithium and potassium; alkaline earth metals, such as calcium and magnesium; aluminum; zinc; cadmium; manganese; nickel; cobalt; cerium; lead; tin; iron; chromium; and mercury. Also included are ammonium ions and alkyl ammonium ions. In particular, those alkyl ammonium ions derived from amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines. It is to be understood that the preferred metal ions are those which render the compound a water-soluble salt. It is to be understood that all of the compounds falling within the above formula I and as heretofore defined are generically described herein as "ethane diphosphonates." In other words then, the acids, salts and mixtures thereof are all generically described herein as ethane diphosphonates.

In general, the ethane diphosphonates are prepared by contacting an epoxy ethane diphosphonate having the following formula:

(II)

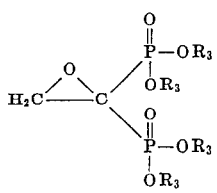

wherein R₃ is the same as defined above, with a deoxiranization agent which opens the ring of said epoxy compound (and provides the substituents on the carbon atoms) to form the ethane diphosphonates falling within formula I. It is to be understood that the term "epoxy ethane diphosphonate" used herein generically describes and encompasses the acid and salt forms, and said term is designated at times herein EEDP for the sake of brevity.

The deoxiranization agents which effect this "ring opening" are from the group water, ammonia, primary amines, secondary amines, acids, malonates, alcohols, mercaptans, Lewis acid catalysts and mixtures thereof. The specific application of these deoxiranization agents are disclosed in the processes which are described hereinafter.

In conjunction with the water "agent," this "ring opening" of EEDP is effected by hydrolysis at a temperature of from about 50° to about 150° C. with or without an inert diluent and acid catalyst, e.g. (respectively), dioxane and HCL.

As illustrative of the ethane diphosphonates which can be prepared according to the aforementioned hydrolysis reaction of EEDP, there may be mentioned, without limitation, the following compounds:

1. $H_2C(OH)C(OH)(PO_3H_2)_2$ 1,2 dihydroxy ethane-1,1-diphosphonic acid
2. $H_2C(OH)C(OH)(PO_3NaH)_2$ disodium 1,2 dihydroxy ethane-1,1-diphosphonate
3. $H_2C(OH)C(OH)(PO_3K_2)_2$ tetrapotassium 1,2 dihydroxy ethane-1,1-diphosphonate
4. $H_2C(OH)C(OH)(PO_3Zn)_2$ dizinc 1,2 dihydroxy ethane-1,1-diphosphonate The deoxiranization agents ammonia, primary amines and secondary amines are generically equated $(R_4)_2NH$ and $R_4$ has the same connotation hereinbefore ascribed. This "ammonolysis" reaction of $(R_4)_2NH$ with EEDP is generally conducted at a temperature between about −40° and about 150° C. under atmospheric conditions.

As illustrative of the ethane diphosphonates which can be prepared according to the aforementioned ammonolysis of EEDP, there may be mentioned, without limitation, the following compounds:

5. $H_2C(NH_2)C(OH)(PO_3H_2)_2$ 2-amino-1-hydroxyethane-1,1-diphosphonic acid
6. $H_2C(OH)C(NH_2)(PO_3H_2)$ 2-hydroxy-1-aminoethane-1,1-diphosphonic acid
7. $H_2C(NH_2)C(OH)(PO_3Na_2)_2$ tetrasodium 2-amino-1-hydroxyethane-1,1-diphosphonate
8. $H_2C(NHCH_3)C(OH)(PO_3H)_2$ 2-methylamino-1-hydroxyethane-1,1-diphosphonic acid
9. $H_2C[N(C_2H_5)_2]C(OH)(PO_3H_2)_2$ 2-diethylamino-1-hydroxyethane-1,1-diphosphonic acid
10. $H_2C[N(C_4H_9)_2]C(OH)(PO_3Zn)_2$ dizinc 2-dibutylamino-1-hydroxyethane-1,1-diphosphonate The "acid" deoxiranization agents, designated herein as HZ, relate to certain inorganic and organic acids which effect the ring opening. Specifically, the cation, Z, is from the group halogen (such as chlorine, bromine, fluorine and the like), −CN, acetoxy ($CH_3COO-$), sulfonate ($SO_3R_4$ wherein $R_4$ has the same connotation as heretofore set forth and is from the group hydrogen and alkyl), benzoyl ($C_6H_5CO-$), and carboxy HOOC−). This acid reaction is generally conducted at a temperature between about −10° and 150° C. under atmospheric conditions.

As illustrative of the ethane diphosphonates which can be prepared according to the aforementioned acid reaction with EEDP, there may be mentioned, without limitation, the following compounds:

11. $H_2C(Cl)C(OH)(PO_3H_2)_2$ 2-chloro-1-hydroxyethane-1,1-diphosphonic acid
12. $H_2C(OH)C(Cl)(PO_3H_2)_2$ 2-hydroxy-1-chloroethane-1,1-diphosphonic acid
13. $H_2C(CN)C(OH)(PO_3KH)_2$ dipotassium 2-cyano-1-hydroxyethane-1,1-diphosphonate
14. $H_2C(SO_3H)C(OH)(PO_3H_2)_2$ 2-sulfo-1-hydroxyethane-1,1-diphosphonic acid
15. $H_2C(F)C(OH)(PO_3HNa)_2$ disodium 2-fluoro-1-hydroxyethane-1,1-diphosphonate
16. $H_2C(SO_3C_2H_5)C(OH)(PO_3H_2)_2$ 2-ethylsulfo-1-hydroxyethane-1,1-diphosphonic acid The malonate deoxiranization agent referred to herein as $MHC(COOR_6)_2$, wherein $R_6$ is the same as hereinbefore ascribed and M is an alkali metal such as sodium, can be reacted WITH EE P at a temperature between about 5° and about 240° C. under atmosphere conditions to form said ethane diphosphonates.

As illustrative of the ethane diphosphonates which can be prepared according to the aforementioned malonate reaction with EEDP, there may be mentioned, without limitation, the following compounds:

17. $HC(COOC_2H_5)_2CH_2C(OH)(PO_3H_2)_2$ diethyl (2-hydroxy-2,2-diphosphonoethyl) malonate
18. $H_2C(OH)C(PO_3H_2)_2CH(COOC_2H_5)_2$ diethyl (2-hydroxy-1,1-diphosphonoethyl) malonate
19. $HC(COOC_4H_9)_2CH_2C(OH)(PO_3H_2)_2$ dibutyl (2-hydroxy-2,2-diphosphonoethyl) malonate
20. $H_2C(OH)C(PO_3Na_2)_2CH(COOCH_3)_2$ dimethyl (tetrasodium 2-hydroxy-2,2-diphosphonoethyl malonate
21. $H_2C(COOCH_3)_2CH_2C(OH)(PO_3H_2)_2$ dimethyl (2-hydroxy-2,2-diphosphonoethyl) malonic acid The alcohol and mercaptan deoxiranization agents, generically referred to herein as $R_5XH$, wherein $R_5$ is the same as hereinbefore ascribed and X is oxygen or sulfur, can be reacted with EEDP at a temperature between 5° and 180° C. under atmospheric conditions to form said ethane diphosphonates. The alcohols utilized are the monoatomic aliphatic alcohols containing from one to 30 carbon atoms, preferably from one to eight carbon atoms, including the respective isomers thereof. Typical alcohols include, for example, methanol, ethanol, propanol and n-butyl alcohol. It is also within the scope of these processes to utilize alcohols such as phenol and benzyl alcohol. The mercaptans utilized are the aliphatic mercaptans containing from one to about 30 carbon atoms, preferably from one to eight carbon atoms, and include, for exemplary purposes only, methyl mercaptan, ethyl mercaptan, propyl mercaptan and n-butyl mercaptan. The isomers of the various mercaptans are also included herein.

As illustrative of the ethane diphosphonates which can be prepared according to the aforementioned reaction of EEDP with either alcohols or mercaptans, there may be mentioned, without limitation, the following compounds:

22. $H_2C(OCH_3)C(OH)(PO_3H_2)_2$ 2-methoxy-1-hydroxy ethane-1,1-diphosphonic acid
23. $H_2C(OH)C(OCH_3)(PO_3H_2)_2$ 2-hydroxy-1-methoxy ethane-1,1-diphosphonic acid
24. $H_2C(OC_2H_5)C(OH)(PO_3NaH)_2$ disodium 2-ethoxy-1-hydroxy ethane-1,1-diphosphonate
25. $H_2C(SCH_3)C(OH)(PO_3H_2)_2$ 2-thiomethyl-1-hydroxy ethane-1,1-diphosphonic acid
26. $H_2C(OC_6H_5)C(OH)(PO_3H_2)_2$ 2-phenoxy-1-hydroxy ethane-1,1-diphosphonic acid
27. $H_2C(SC_6H_5)C(OH)(PO_3H_2)_2$ 2-thiophenyl, 1-hydroxy ethane-1,1-diphosphonic acid The reaction of EEDP in the presence of a metal halide Lewis acid yields the "oxy" derivative according to the following equation:

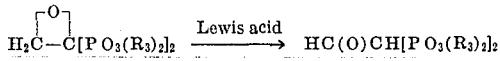

In conjunction with the above reaction, a wide variety of Lewis acids can be utilized in order to effect an acid catalyzed rearrangement of the epoxy ethane diphosphonate. There may be mentioned for exemplary purposes only and without any limitation metal halide Lewis acids such as boron trifluoride, zinc chloride, magnesium bromide, ferric chloride, stannic chloride, titanium chloride, zirconium chloride, aluminum chloride and the like. In conjunction with the utilization of the Lewis acid for the acid catalyzed rearrangement, it is preferred to first dissolve or suspend the metal halide in a nonaqueous inert aprotic solvent such as nitromethane, dichloromethane, nitrobenzene, nitropropane, chlorobenzene, dichlorobenzene, dichloroethane, tetrachloroethane, perchloroethylene, petroleum ether, carbon tetrachloride, chloroform, carbon disulfide, ethyl ether, benzene and the like, and then contact the resultant solution or slurry with the EEDP material. The amount of solvent utilized is not a limiting factor as long as that amount chosen does not substantially adversely affect the preparation of the desired end product.

The acid catalyzed rearrangement of the epoxy ethane diphosphonate is generally conducted with the epoxy ethane diphosphonate and a Lewis acid catalyst (and, if desired, an inert aprotic solvent such as ethyl ether) at a temperature between about −20° and 150° C., and under atmospheric conditions. Higher or lower temperatures can be utilized, e.g., as low as 50° and as high as 250° C., depending, for example, upon the boiling point of said solvent. It is within the scope of the present invention that superatmospheric (e.g., from about 1 to 10 atmospheres) and subatmospheric (e.g. ½ to 760 mm. Hg) conditions and also in an inert atmosphere such as nitrogen or helium may be utilized where one so desires.

The quantity of Lewis acid catalyst utilized in conjunction with the acid catalyzed rearrangement will vary somewhat, depending upon the type of metal halide Lewis acid catalyst utilized, the temperature at which the reaction takes place, and, in some instances, the pressure of the system. It is to be understood that any amount of Lewis acid catalyst can be utilized as long as that amount is not substantially detrimental to achieving the desired end product. It is found that from about 0.01 to about 4 mole equivalents of said catalyst for each mole of EEDP starting material suffices to form the aforesaid "oxy" derivative in satisfactory yields.

As illustrative of the ethane diphosphonates which can be prepared according to the aforementioned acid catalyzed rearrangement of EEDP, there may be mentioned, without limitation, the following compounds:

28. $HC(O)C(H)(PO_3H_2)_2$ 2-oxy ethane-1,1-diphosphonic acid
29. $HC(O)C(H)(PO_3NaH)_2$ disodium 2-oxy ethane-1,1-diphosphonate
30. $HC(O)C(H)(PO_3K_2)_2$ tetrapotassium 2-oxy ethane-1,1-diphosphonate The aforementioned epoxy ethane diphosphonates (EEDP) which are the basic starting materials in conjunction with the preparation of the ethane diphosphonates falling within formula I can be prepared, for example, by reacting the disodium salt of ethylene diphosphonic acid, i.e.,

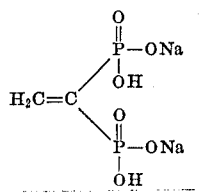

with hydrogen peroxide (which functions as an epoxidizing agent) in the presence of a catalyst such as sodium tungstate. The above ethylene diphosphonate, also sometimes referred to in the art as vinylidene diphosphonate, is known in the art (in its ester form and processes for preparing the same) as exemplified by U.S. Pat. No. 3,062,792, which is incorporated herein by reference. The ethylene diphosphonic acids and salts per se and processes for preparing the same are described in Canadian Pat. No. 811,736, which is incorporated herein by reference.

Although the precipitation inhibitors of the present invention are of general utility whenever it is desired to inhibit the precipitation of metal ions from aqueous solutions, they are especially effective in such applications as liquid soaps and shampoos, bar soaps, scouring wool cloth, cotton kier boiling, cotton dyeing, cotton bleaching, metal cleaning compounds, rubber and plastics trace metal contamination (compounding and polymerization), and pulp and paper trace metal contamination.

The amount of the precipitation inhibitor necessary to be effective varies with, inter alia, the type and amount of problem metal ions, pH conditions, temperature and the like. When using substoichiometric amounts the preferred mole ratio of the precipitation inhibitor to the scale forming cation salt is from about 1:1.5 to about 1:10,000. When using sequestering amounts, i.e., at least stoichiometric quantities, the preferred mole ratio is from about 1:1 to about 2.5:1.

It is within the scope of the present invention that the precipitation inhibitors of the present invention may also be used in aqueous systems which contain inorganic or organic materials, with the proviso that such materials do not render the precipitation inhibitors substantially ineffective for their end purpose. For exemplary purposes only, water-soluble inorganic chromates such as those described in U.S. Pat. No. 3,431,217 (which is incorporated herein by reference) may be used in combination with said inhibitors. Other materials which can be used with said precipitation inhibitors include, for example, surface active agents and corrosion inhibitors such as those described in Corrosion Inhibitors, by Beegman, published by MacMillan in 1963 and which is incorporated herein by reference. Furthermore, other precipitation inhibitors such as amino tri(methylene phosphonic acid) may be used in combination with the precipitation inhibitors of the present invention. For exemplary purposes only, these other precipitation inhibitors are described in U. S. Pat. No. 2,970,959, U.S. Pat. No. 3,234,124, U.S. Pat. No. 3,336,221, U.S. Pat. No. 3,400,078, U.S. Pat. No. 3,400,148, U.S. Pat. No. 3,451,939, and U.S. Pat. No. 3,462,365, all of which publications are incorporated herein by reference.

The following examples are included to illustrate the practice of the present invention and the advantages provided thereby but are not to be considered limiting.

EXAMPLE I

The following example is carried out, illustrating the sequestering ability of the acid and salt forms of the ethane diphosphonates.

The testing procedure consists of pipetting an aliquot volume of 2.5 percent ferric chloride solution into a beaker and adding thereto enough sodium hydroxide or hydrochloric acid to give the desired pH. The solution is stirred for 15 minutes, followed by the addition of an aliquot of 2.5 percent of the sequestering agent solution, i.e., the particular ethane diphosphonate (in the salt form) dissolved in water. After final pH adjustment with sodium hydroxide or hydrochloric acid, the solution is shaken for 48 hours to reach equilibrium. The solution is then centrifuged at 12,000 r.p.m. for approximately 80 minutes to remove colloidal ferric hydroxide and an aliquot of the supernatant solution is titrated iodometrically or analyzed by X-ray fluorescence with use of an appropriate calibration curve in order to determine the ferric iron concentration. The ferric iron concentrations and sequestering agent concentrations found in parts per million (p.p.m.) are converted to a weight basis and expressed as pounds of iron sequestered by 100 pounds of sequestering agent.

Following the above described procedure, each of the compounds Nos. 1 through 30 heretofore described and prepared according to the procedures outlined in this specification, is individually tested. In each case it is found that the precipitation inhibitors of the instant invention demonstrate an unexpected and unique ability to sequester ferric iron over a wide range of pH conditions, i.e., from about 4 to about 10.5, and that the average amount (in pounds) of iron sequestered by 100 pounds of the respective precipitation inhibitor (compound No.) over the 4 to 10.5 pH range is 13, 15, 14, 5, 8, 7, 10, 11, 10, 5, 12, 11, 9, 11, 7, 11, 6, 4, 7, 5, 6, 12, 12, 5, 11, 8, 6, 12, 8 and 7.

EXAMPLE II

The above example I is repeated several times with the exception that other metal ion-containing solutions such as calcium, copper, nickel and chromium are utilized in place of the ferric (chloride) solution. In each case utilizing the aforementioned compounds the average sequestration values of these latter mentioned ions respectively are found to be similar to those set forth above.

Example I is again repeated several times, utilizing as a sequestering agent trisodium nitrilo triacetate ·2H$_2$0, sodium citrate, and potassium gluconate. It is found that the pounds of iron sequestered by 100 pounds of the aforementioned sequestering agents respectively are 7.0, 6.5 and 2.9 over the same pH range of 4 to 10.5. It can readily be seen, then, that the ethane diphosphonates (in the acid or salt forms) of the present invention when utilized as sequestering agents are equally as effective as the widely used organic sequestering agents under comparative conditions and in some cases are superior thereto. Furthermore, when said ethane diphosphonates of the present invention are utilized as sequestering agents, they exhibit an effectiveness as such over a wide range of pH conditions. This is highly advantageous in permitting their respective use in many and varied applications.

EXAMPLE III

The present invention ethane diphosphonates falling within formula I also exhibit threshold properties, i.e., they can be utilized in less than stoichiometric quantities to prevent the precipitation of salts of mineral acids, such as CaCO$_3$, in aqueous systems. Specifically, a test is conducted in which each of the compounds set forth in the above example I is separately and independently mixed at 25° C. with 250 milliliters of water containing CaCl$_2$. To the resultant mixture is added NaHCO$_3$. The pH in each case is adjusted to 7 and maintained thereat with sufficient NaOH or HCl. The amounts of CaCl$_2$, NaHCO$_3$ and ethane diphosphonate used are sufficient to provide 5,000 p.p.m. of CaCO$_3$ and 10 p.p.m. of ethane diphosphonate (precipitation inhibitor). It is observed in each case that these less than stoichiometric quantities of said precipitation inhibitors (threshold agents) effect a substantially clear solution for a period of at least 48 hours. Stating the results in a different manner, 10 parts per million of the ethane diphosphonate (threshold agent) is effective in providing a clear solution without precipitation which contains substantially greater than stoichiometric quantities of calcium carbonate therein.

The foregoing examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A method of inhibiting the precipitation of scale-forming salts in an aqueous system comprising adding to said system at least a precipitating inhibition amount of an ethane diphosphonate having the formula

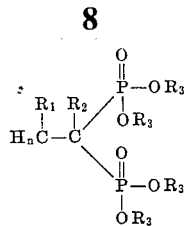

wherein a. $R_1$ is selected from the group consisting of oxygen; halogen; hydroxy; –CN; –N(R$_4$)$_2$ wherein R$_4$ is selected from the group consisting of hydrogen and alkyl; –XR$_5$ wherein X is selected from the group consisting of oxygen and sulfur and R$_5$ is selected from the group consisting of alkyl, C$_6$H$_5$ and C$_7$H$_7$; acetoxy; –SO$_3$R$_4$ wherein R$_4$ is the same as defined above; benzoyl; –CO$_2$H; and

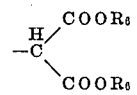

wherein R$_6$ is an alkyl group containing from 1 to 30 carbon atoms;

b. $R_2$ is selected from the group consisting of R$_1$, except oxygen; and hydrogen; with the proviso that R$_2$ is only hydrogen when R$_1$ is oxygen; and with the proviso that in all cases, except when R$_1$ is oxygen and R$_2$ is hydrogen, at least R$_1$ or R$_2$ is hydroxy;

c. $R_3$ is selected from the group consisting of metal and amine ions and hydrogen;

d. $n$ is an integer having a value of 1 or 2 and N is 1 when R$_1$ is oxygen.

2. The method of claim 1 wherein the scale-forming salt is alkaline earth metal carbonates, sulfates, oxalates, phosphates, fluorides or silicates.

3. The method of claim 1 wherein the mole ratio of precipitation inhibitor to scale-forming salts is from about 1 to 1.5 to about 1 to 10,000.

4. The method of claim 3 wherein the precipitation inhibitor is present in the system at concentrations from about 0.1 part per million to about 500 parts per million.

5. The method as set forth in claim 1 wherein R$_3$ is hydrogen.

6. The method as set forth in claim 1 wherein R$_3$ is a metal ion selected from the group consisting of alkali metals, alkaline earth metals, aluminum, zinc, calcium, manganese and mixtures thereof.

7. The method as set forth in claim 1 wherein R$_1$ and R$_2$ are either hydroxy or –N(R$_4$)$_2$ groups with the proviso that neither R$_1$ nor R$_2$ are alike.

8. The method as set forth in claim 1 wherein R$_1$ and R$_2$ are either –XR$_5$ or hydroxy groups with the proviso that neither R$_1$ nor R$_2$ are alike.

9. The diphosphonate compound as set forth in claim 1 wherein R$_1$ and R$_2$ are either –CN or hydroxy with the proviso that neither R$_1$ nor R$_2$ are alike.

10. The diphosphonate compound as set forth in claim 1 wherein R$_1$ and R$_2$ are both hydroxy groups.

11. The diphosphonate compound as set forth in claim 1 wherein R$_1$ and R$_2$ are either hydroxy or –SO$_3$R$_6$ with the proviso that neither R$_1$ nor R$_2$ are alike.

12. The diphosphonate compound as set forth in claim 1 wherein R$_1$ and R$_2$ are either halogen or hydroxy with the proviso that neither R$_1$ nor R$_2$ are alike.

13. The method as set forth in claim 1 wherein R$_1$ and R$_2$ are either hydroxy or

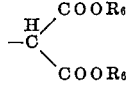

with the proviso that neither R$_1$ nor R$_2$ are alike.

14. The method as set forth in claim 1 wherein the ethane diphosphonate is a compound having the formula

9

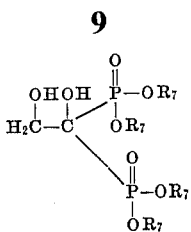

wherein $R_7$ is an alkali metal.

15. The method as set forth in claim 1 wherein the ethane diphosphonate is a compound having the formula

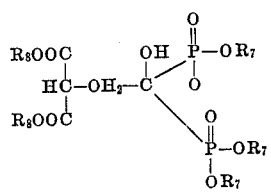

wherein $R_7$ and $R_8$ are alkali metals.

16. The method as set forth in claim 1 wherein the ethane diphosphonate is a compound having the formula

10

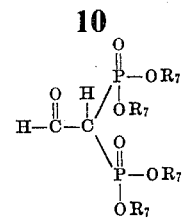

wherein $R_7$ is an alkali metal.

17. The method as set forth in claim 1 wherein the ethane diphosphonate is 1,2-dihydroxyethane-1,1-diphosphonic acid.

18. The method as set forth in claim 1 wherein the ethane diphosphonate is 2-cyano-1-hydroxyethane-1,1-diphosphonic acid.

19. The method as set forth in claim 1 wherein the ethane diphosphonate is hexasodium 2-hydroxy-2,2-diphosphono ethylmalonate.

20. The method as set forth in claim 1 wherein the ethane diphosphonate is 2-thiometyl-1-hydroxyethane-1,1-diphosphonic acid.

21. The method as set forth in claim 1 wherein the ethane diphosphonate is 2-oxyethane-1,1-diphosphonic acid.

22. The method as set forth in claim 1 wherein the aqueous system contains a water-soluble chromate.

23. The method as set forth in claim 6 wherein at least one $R_3$ is zinc which is supplied to the aqueous system in the form of a water-soluble zinc salt.

* * * * *

Notice of Adverse Decision in Interference

In Interference No. 98,787, involving Patent No. 3,617,576, A. F. Kerst, METHODS OF SCALE INHIBITION, final judgment adverse to the patentee was rendered June 3, 1977, as to claims 1, 5, 6 and 12.

[*Official Gazette October 25, 1977.*]